Figure 1:
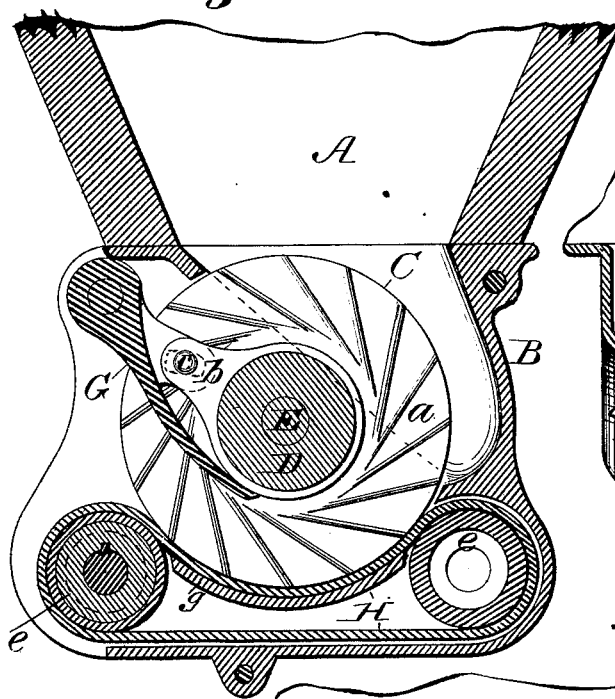

2 Sheets—Sheet 1.

A. J. MARTIN.
Force-Feed for Grain-Drills and Seeders.

No. 198,495. Patented Dec. 25, 1877.

Witnesses:
Donn V. Twitchell.
Will N. Dodge.

Inventor:
A. J. Martin
By Dodgerson
attys

2 Sheets—Sheet 2.
A. J. MARTIN.
Force-Feed for Grain-Drills and Seeders.
No. 198,495. Patented Dec. 25, 1877.
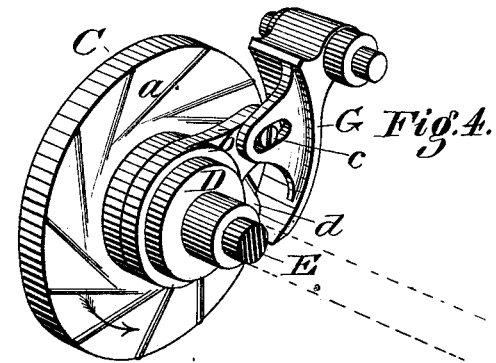
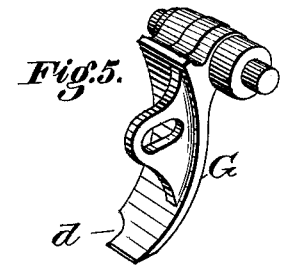
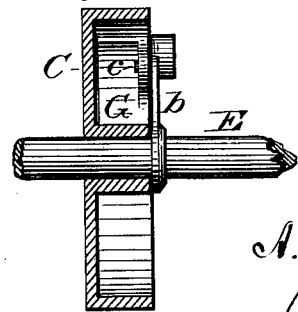
Witnesses:
Donn P. Twitchell
Will W. Dodge.
Inventor:
A. J. Martin.
By Dodge & Son
Attys.

UNITED STATES PATENT OFFICE.

ANDREW J. MARTIN, OF SPRINGFIELD, OHIO.

IMPROVEMENT IN FORCE-FEEDS FOR GRAIN-DRILLS AND SEEDERS.

Specification forming part of Letters Patent No. 198,495, dated December 25, 1877; application filed November 13, 1877.

*To all whom it may concern:*

Be it known that I, ANDREW J. MARTIN, of Springfield, in the county of Clarke and State of Ohio, have invented certain Improvements in Force-Feeds for Grain-Drills and Seeders, of which the following is a specification:

My invention relates more particularly to that class of feeding mechanisms in which a vertical wheel or disk is arranged to deliver the grain in a continuous stream through a cup or case; and the improvements consist in the employment of a feed-regulating gate, which is controlled and adjusted from or through the center of the wheel; in the employment of an endless belt or apron in connection with the feed-wheel; and in a special construction and arrangement of the details, all as hereinafter more fully explained.

Of late years it has been customary to use, in connection with the individual wheels, of force-feeding devices, regulating-gates to control and vary the rate at which the grain is discharged without changing the speed of the wheels, and it is to these gates or regulating devices that the first part of my invention relates. Hitherto the gates have been extended beyond the periphery of the wheels and connected with a rod, shaft, or similar device, by which they were controlled and adjusted, or else they were mounted wholly within the periphery of the wheels, with a shaft or journal extending out through the side of the feed cup or case to connect with the actuating or adjusting devices.

My improvement consists in controlling and adjusting the gates by means of devices of any suitable character, operating or connecting through the center or axis of the feed-wheel.

The gate or regulating device may swing upon a center or slide back and forth, and may be generally constructed and arranged in any ordinary or suitable manner, provided it is actuated and controlled through the center of the feed-wheel, or by devices working on an axis concentric with that of the wheel.

One simple plan of construction is to divide the wheel through its center vertically, mount it loosely upon a shaft or rod, by which the gates are to be controlled, and secure upon said rod, between the two parts of the wheel, an arm, arranged to act directly upon the gate, tongue, slide, or other feed-regulating device.

The essential feature of the invention is the operation of the feed-regulating device from the center of the feeder, and it will be manifest to the skilled mechanic that there are many ways in which this may be accomplished Among the arrangements which may be employed to transmit the motion from the central rod or regulating-shaft to the gates, tongues, or equivalents, may be mentioned a pinion or an eccentric on the rod, to act directly upon the gates or tongues, or upon intermediate devices connecting therewith. The above-mentioned devices of course require the rod to be rotated. When this is not desired, the rod may have a longitudinal incline to act upon the gate or gate-operating device, in which case an end movement of the rod will operate the gate.

I design, ordinarily, to extend the central rod or shaft by which I control my gates the entire width of the machine, through the entire series of feeding devices, in order to regulate all the gates in unison. When this is done, the feed-wheels will require to be driven either at their periphery or on one side, which may be effected by belts, friction-wheels, or gearing.

When driven from the periphery, the wheels may be sustained by and turn upon the feed-regulating rod or shaft, or by journals or trunnions on their sides, seated in suitable bearings in the cup or case, or elsewhere. One simple method of driving the feed-wheel is by means of an endless belt bearing on its periphery, the belt being sustained on rollers, one of which is driven by the gearing of the machine. This belt may be mounted below the wheel, and when the latter is of the class having an open grooved periphery, the belt thus arranged will materially assist it in effecting a uniform delivery of the grain.

The belt or apron may be used with a decided advantage for the mere purpose of assisting in the delivery of the grain, regardless of the manner in which the wheel is driven, and without reference to the manner in which the rate of feed is controlled, the grooved wheel, in connection with the belt, forming a feeder in which all four sides of the grain channel or throat move and assist in carrying the grain.

While, as above stated, my improvements are susceptible of various changes and modifications, the accompanying drawings represent the construction which I deem the best adapted for general use, and which embraces all three features of my invention.

Figure 2:
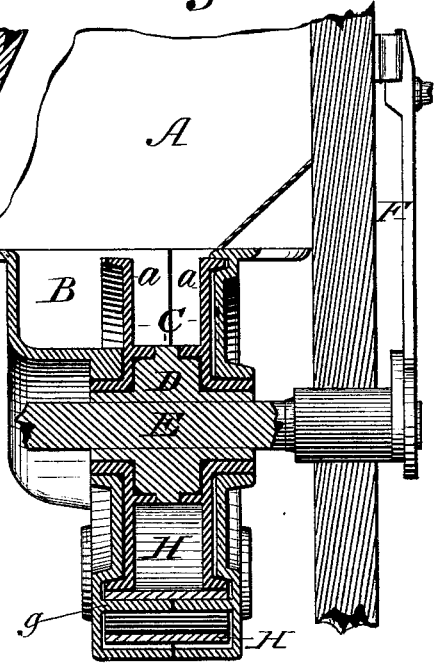
Figure 3:
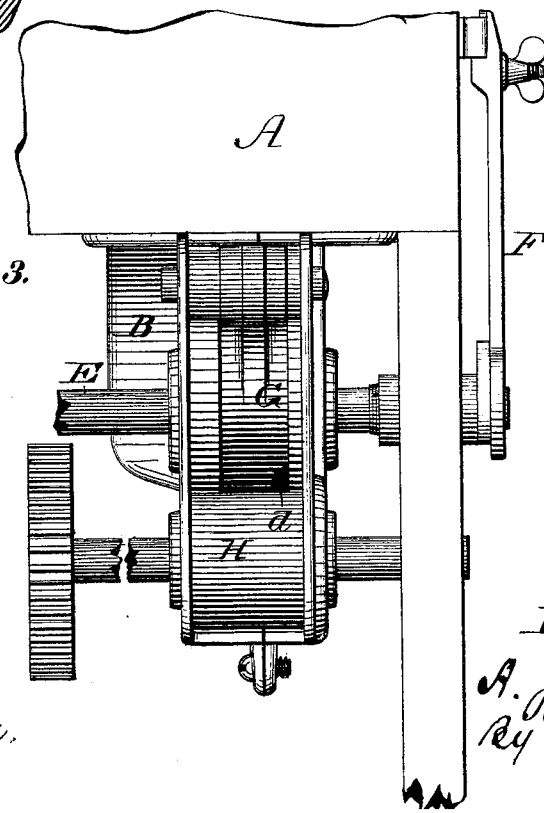

Figure 1 represents a vertical section through the feeder from front to rear; Fig. 2, a vertical transverse section of the same through the center; Fig. 3, a rear elevation of the same; Fig. 4, a perspective view of the feed-regulating gate, the device by which it is controlled, and the feed-wheel, with one side removed to expose the other parts to view; Fig. 5, a perspective view of the gate or feed-controlling device detached; Fig. 6, a vertical transverse section, showing the feed-regulating gate applied to a different form of wheel.

A represents the hopper or grain-box, which will be extended across the machine, and provided at the bottom with a series of feeding devices arranged in line in the customary manner. B represents the feed cup or case, secured to the under side of the grain-box, and adapted to inclose the feed-wheel C and conduct the grain from the box thereto. The wheel represented in the drawing is constructed with a circumferential groove of a rectangular form in cross-section, in which the grain is received at the top and carried downward and discharged at the rear in substantially the ordinary manner. The wheel shown, instead of being made in one piece and secured rigidly on a central driving-shaft, as usual, is divided at right angles to its axis into two parts or halves, a a, which are mounted loosely and independently upon journals formed on the ends of a central hub, D, which is secured firmly on a central rock-shaft or rod, E, which latter is extended outward beyond the end of the grain-box, and provided with an arm, F, by means of which it is adjusted and fastened. The hub D is provided at its middle with an arm, b, extending outward between the two parts of the wheel from the center toward the periphery, and on the side of said arm there is formed a stud, c, which engages, as shown in Figs. 1 and 4, with a slotted arm on a swinging gate or tongue, G, which latter is pivoted in the feed cup or case, with its free end arranged to swing in the channel or groove of the wheel, in the manner represented in Figs. 1 and 2. By moving the arm F, the shaft E and hub D may be turned, to a limited extent, at will, and the arm of the hub thereby caused to move the gate or tongue G, which is so arranged that its movement increases or diminishes the size of the grain-outlet, so as to vary the rate of discharge without changing the speed of the wheel.

The movement of the hub and gate is, it will be noticed, entirely independent of the rotation of the wheel, the parts of which rotate freely on the hub.

The gate is shown with its axis at its upper end in the rear upper corner of the cup or case, so that its point or nose is presented toward the moving stream of grain, which is divided thereby, one portion of the stream being permitted to pass below the gate and escape, while the other portion continues its course around within the gate and cup.

In order to permit the feeding of a very small amount of grain, the tongue or gate is cut away at its point on one side, as shown at D, Figs. 3 and 5, in order to afford an outlet when the gate is in such position that it would otherwise cut off the feed entirely.

The feed-wheel, instead of being driven from the center, as usual, is driven by a belt or apron, H, bearing against its periphery, the belt being sustained in the bottom of the case by two rollers, e, one of which receives motion from any suitable part of the machine. As shown in the drawing, the bottom of the cup or case is cut away directly below the feed-wheel, and the endless belt or apron arranged to take the place of said cut-away portion by bearing against the lower edges of the wheel, and forming a bottom for its channel and a support for a stream of grain therein. The belt meets the wheel under its front side, as shown, and extends thence backward in contact therewith to the point of delivery or discharge, so that the stream of grain descending in front of the wheel, instead of resting upon and requiring to be forced over a stationary surface, as usual, is received upon and carried backward and discharged by the belt or apron, the delivery being, of course, assisted by the wheel acting in the ordinary manner. It will be observed that the central hub of the feed-wheel, its two sides, and the moving belt, acting in conjunction with each other, form a grain channel or throat, all four sides of which are moving carrying-surfaces, which tend to urge the grain toward the delivery, in consequence of which the grain is delivered in a steady, uniform stream. By the use of the belt or apron, in addition to the wheel, the certainty of action under all circumstances and conditions is secured, the feeder adapted for delivering all kinds of grain, and choking and clogging by straws and other foreign matters avoided. The form and arrangement of the apron and the form of the wheel and its channel may be modified, provided the apron or belt acts as a grain-carrying surface in connection with the wheel.

In the drawing, the feed cup or case is provided with an inside plate g to sustain the belt or apron against the wheel, and is also made to inclose and protect the front roll e and the lower side of the belt or apron, but either or both of said features may be omitted or modified. It is manifest that the belt or apron may be used merely as a part of the feed mechanism, and the feed-wheel driven in any suitable manner, and also that the wheel may be driven at its periphery by a friction-wheel or a pinion when the feed-apron is not used.

Fig. 6 illustrates the manner in which my method of actuating the feed-regulating gate from the center may be used in connection with those wheels which have an annular grain-carrying channel in one side. It will be seen that the arrangement is essentially the same as that shown in Figs. 1 and 4, the only difference being that the gate-actuating arm is located at the open side of the wheel instead of in its middle, and that the gate is located wholly within the periphery of the wheel instead of extending outside of its periphery. While I have in the drawings shown a pivoted gate or tongue engaging directly with the arm of the central hub, it is manifest that a sliding gate or regulating device may be used, and that, whatever the form of the gate, it may be connected by intermediate devices with the central hub, instead of having the direct connection.

When the wheel used is of the class represented by the one shown in Fig. 6, the hub or arm to actuate the gate may have a bearing on and around a central hub on the side of the wheel or in the side of the case, or it may bear upon the central shaft for driving the wheel in the event of its being used; but in either of said cases, the gate-operating device must have a sleeve or other part extending out through the side of the feed cup or case at the center, to receive the operating devices.

In all cases all the feed-regulating gates in the machine are to be connected and arranged to operate simultaneously.

Having thus described my invention, what I claim is—

1. In a force-feed for grain-drilling or seeding machines, a gate or tongue to regulate the discharge, connected with and operated by a device, substantially as described, at the center of the feed-wheel, substantially as shown and described.

2. The combination, in a force-feed, of a feeding-wheel, a gate or tongue to govern the rate of discharge, and an arm or equivalent device for controlling said gate, having its axis of motion concentric with the axis of the feed-wheel.

3. The combination of a case or cup, B, a feed-wheel, C, a regulating gate or tongue, G, and a central hub, D, connected with and arranged to operate the gate or tongue.

4. The combination of the divided and peripherally-driven feed-wheel C, the pivoted gate G, and the central hub D, in the manner shown and described.

5. In a grain-drilling or seeding machine, the combination of a force feed or feeds, each having a feed-regulating gate or tongue, and a central arm or equivalent device, substantially such as described, for operating the same, with a rod or shaft, E, to operate said central device, and an arm or indicator, F, on the end of said shaft, substantially as described and shown.

6. In a force-feed, the combination of a wheel, feeding at its periphery, and an endless belt or apron acting in conjunction therewith, to feed the grain.

7. The combination, substantially as shown, of a feed cup or case, a peripherally-grooved feed-wheel, and an endless flexible belt or apron, arranged below and in close proximity to the wheel, substantially as shown.

8. In a feeding device for a grain-drill or seeder, an endless apron or belt, adapted and arranged to carry a continuous stream of grain, having its rear end higher than its middle, as shown, to prevent the grain from flowing outward, except as it is carried by the motion of the apron.

9. In combination with the feed-wheel C, the belt or apron, arranged to serve the two purposes of operating the wheel and assisting the delivery of the grain.

10. In a force-feed for grain-drills, &c., the combination of a feed-wheel with an endless belt, to assist the same in delivering the grain evenly and uniformly, substantially as shown and described.

ANDREW J. MARTIN.

Witnesses:
W. G. MAITLAND,
J. B. CHRISTIE.